Nov. 11, 1924. 1,515,548
R. CEROTSKY
APPARATUS FOR REBORING HOLES ON DRILLING MACHINES AND TURNING LATHES
Filed Aug. 29, 1921
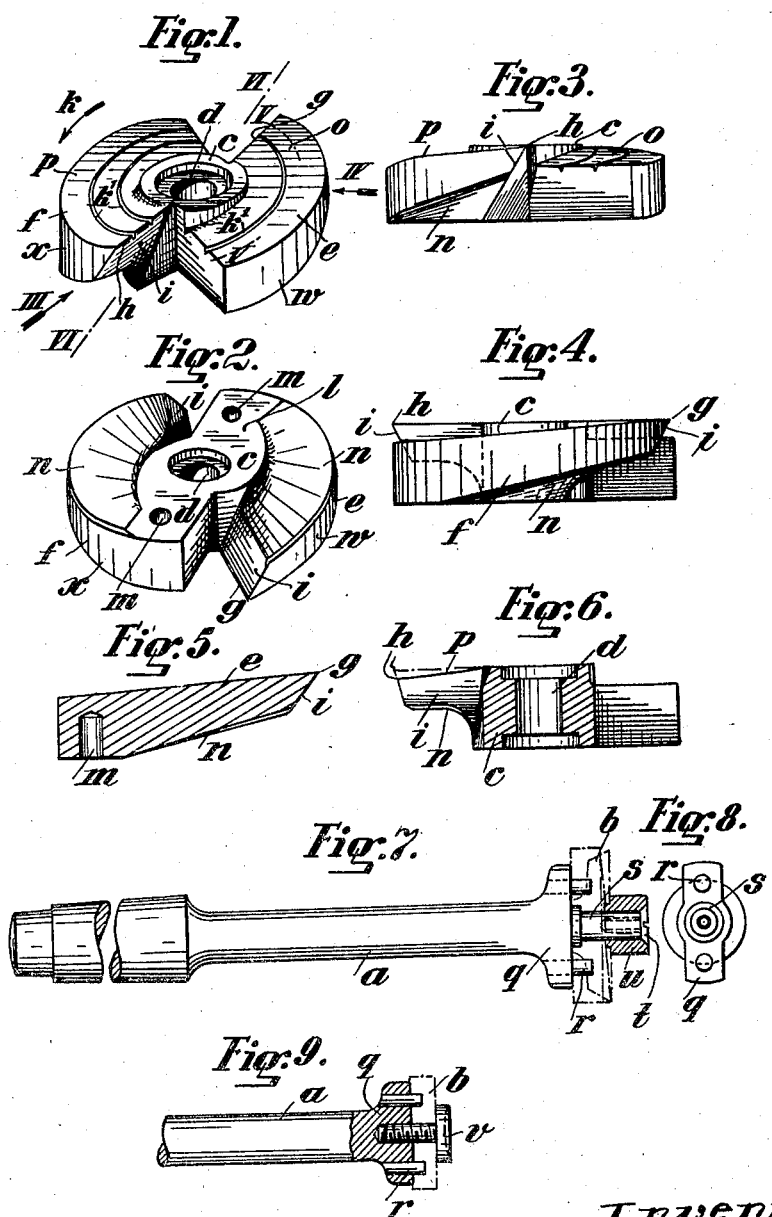
Inventor
R. Cerotsky,
By Marks&Clerk
Attys.

Patented Nov. 11, 1924.

1,515,548

UNITED STATES PATENT OFFICE.

RUDOLF CEROTSKY, OF CHARLOTTENBURG, NEAR BERLIN, GERMANY, ASSIGNOR TO WILHELM SASSE, OF SPANDAU, PRUSSIA, GERMANY.

APPARATUS FOR REBORING HOLES ON DRILLING MACHINES AND TURNING LATHES.

Application filed August 29, 1921. Serial No. 496,234.

(GRANTED UNDER THE PROVISIONS OF THE ACT OF MARCH 3, 1921, 41 STAT. L., 1313.)

*To all whom it may concern:*

Be it known that I, RUDOLF CEROTSKY, engineer, citizen of Germany, residing at Charlottenburg, near Berlin, Prussia, Germany, 31 Spandauer Berg, have invented certain new and useful Improvements in Apparatus for Reboring Holes on Drilling Machines and Turning Lathes (for which I have filed an application for patent in Germany December 4, 1918), of which the following is a specification.

This invention relates to boring tools for use in drilling machines and turning lathes. The object of the invention is to render the use of twist drills unnecessary which are expensive in first cost and regrinding and to produce an appliance which is simple, cheap in the manufacture and can easily be reground.

In the accompanying drawing two modifications of the boring tool and of the improved construction of the holder for such a tool are illustrated by way of example.

Fig. 1 is a perspective view of the improved boring tool viewed from the cutting surface, Fig. 2 is a perspective view of the same tool viewed from the rear, showing its attachment surface upon the holder, Fig. 3 is an edge elevation of the boring tool in the direction of the arrow III in Fig. 1, Fig. 4 is an edge elevation of the boring tool in the direction of the arrow IV in Fig. 1, Fig. 5 is a developed section along line V—V of Fig 1, Fig. 6 is a section along line IV—IV of Fig. 1, but of a slightly modified construction of the cutting edges, Fig. 7 is a holder for a large sized boring tool in elevation, Fig. 8 an end elevation of the same and Fig. 9 a sectional elevation of a holder for a small boring tool.

Similar parts are indicated by the same letters of reference throughout all the figures of the drawing.

Referring to the drawing it will be seen that the apparatus comprises a holder $a$ fitted with a tapered shank adapted to be inserted into the socket of the boring-bar or spindle and the disc-like boring tool $b$. The boring tool $b$ consists of a head $c$ provided with a perforation $d$ and forming the base for two segment-like parts $e$ and $f$. The construction of these segments $e$ and $f$ will be clearly seen in the Figures 1-6. The part $e$ as well as the part $f$ terminates in a cutting edge $g$ or $h$. These cutting edges are disposed diametrically opposite each other. The outer side faces $o$, $p$ of the parts $e$ and $f$ are set back from the cutting edges $g$ and $h$, as shown in Fig. 1, and the slide surfaces $i$ commencing at the cutting edges $g$ and $h$ are not disposed at right angles to the set back surfaces $o$, $p$ but somewhat oblique in the direction of the rotation $k$ of the boring tool. The circumferential surfaces $w$, $x$ which join the slide surfaces are also slightly set back in order to reduce the rubbing action of the tool. The set back surfaces $o$, $p$ of the parts $e$ and $f$ are also provided with grooves $k^1$, as shown in Fig. 1.

The rear surface of the boring tool facing the holder consists of the plane contacting surface $h$ with the two holes $m$ for engagement with the holder pins and two annular surfaces $n$ which slant from the base $l$ towards the slide surfaces $i$, in order to avoid making these slide surfaces $i$ unnecessarily high.

In the modified construction illustrated in Fig. 6, the set back faces $o$, $p$ slant slightly from the central attachment portion towards the circumference, as shown in full lines in Fig. 6. The dotted lines indicate how the surfaces $p$ and $o$ are disposed in the case of holes of smaller diameter if the slanting of the surfaces $o$, $p$ towards the circumference is not considered necessary.

The holder $a$ for the boring tool $b$ terminates in both constructions shown in Figs. 5, 7 and 9 in a head $q$ upon which are mounted the two pins $r$ for revolving the tool by engagement with its holes $m$. In the modification of the apparatus illustrated in Fig. 7, the holder is provided with a central extension $s$ which passes through the central bore $d$ of the boring tool and which serves for the reception of the attachment screw $t$. The attachment of the boring tool $b$ is in this case effected by the counter-sunk screw $t$ in conjunction with a sleeve $u$ which where the screw $t$ is screwed home forces the tool $b$ against the holder $a$ and which at the same time serves as guide for the apparatus or appliance within the drilled hole to be enlarged.

In the construction of the holder according to Fig. 9, which is particularly intended for smaller diameters, the attachment of the boring tool is effected by means of a screw $v$ adapted to be screwed into the holder, passing through the central bore of the tool and possessing a round head which serves for the guidance of the apparatus within the drilled hole.

It will be understood that the details of the construction may be varied within the ambit of the claims without departing from the spirit of the invention or sacrificing any of its advantages.

What I claim as my invention and desire to secure by Letters Patent is:

1. A tool of the character described including a disk provided with diametrically opposite substantally V-shaped cut away portions to provide oppositely disposed cutting blades, each of said blades having a cutting edge arranged at the lower surface of the disk, the lower surface of each cutting blade being gradually inclined upwardly from the cutting edge to the opposite end of the blade, the upper surface of each blade being also gradually inclined upwardly from the cutting edge in a direction toward the opposite end of the blade, and the peripheral side surface of each blade gradually curving toward the axis of the disk from the cutting edge of each blade toward the opposite end of said blade, each blade gradually increasing in thickness in a direction away from the cutting edge.

2. A tool as claimed in claim 1 in which the lower surface of each blade is also inclined upwardly from a point adjacent the axis of the disk to the peripheral edge of the blade.

In testimony whereof I have given my signature.

RUDOLF CEROTSKY.